Feb. 20, 1934. M. H. HOLLINGSWORTH 1,947,598
AUTOMOBILE PARKING DEVICE
Filed Feb. 7, 1933 5 Sheets-Sheet 1

Inventor
M. H. Hollingsworth
By Clarence A. O'Brien
Attorney

Feb. 20, 1934.   M. H. HOLLINGSWORTH   1,947,598
AUTOMOBILE PARKING DEVICE
Filed Feb. 7, 1933   5 Sheets-Sheet 2

Inventor
M. H. Hollingsworth
By Clarence A. O'Brien
Attorney

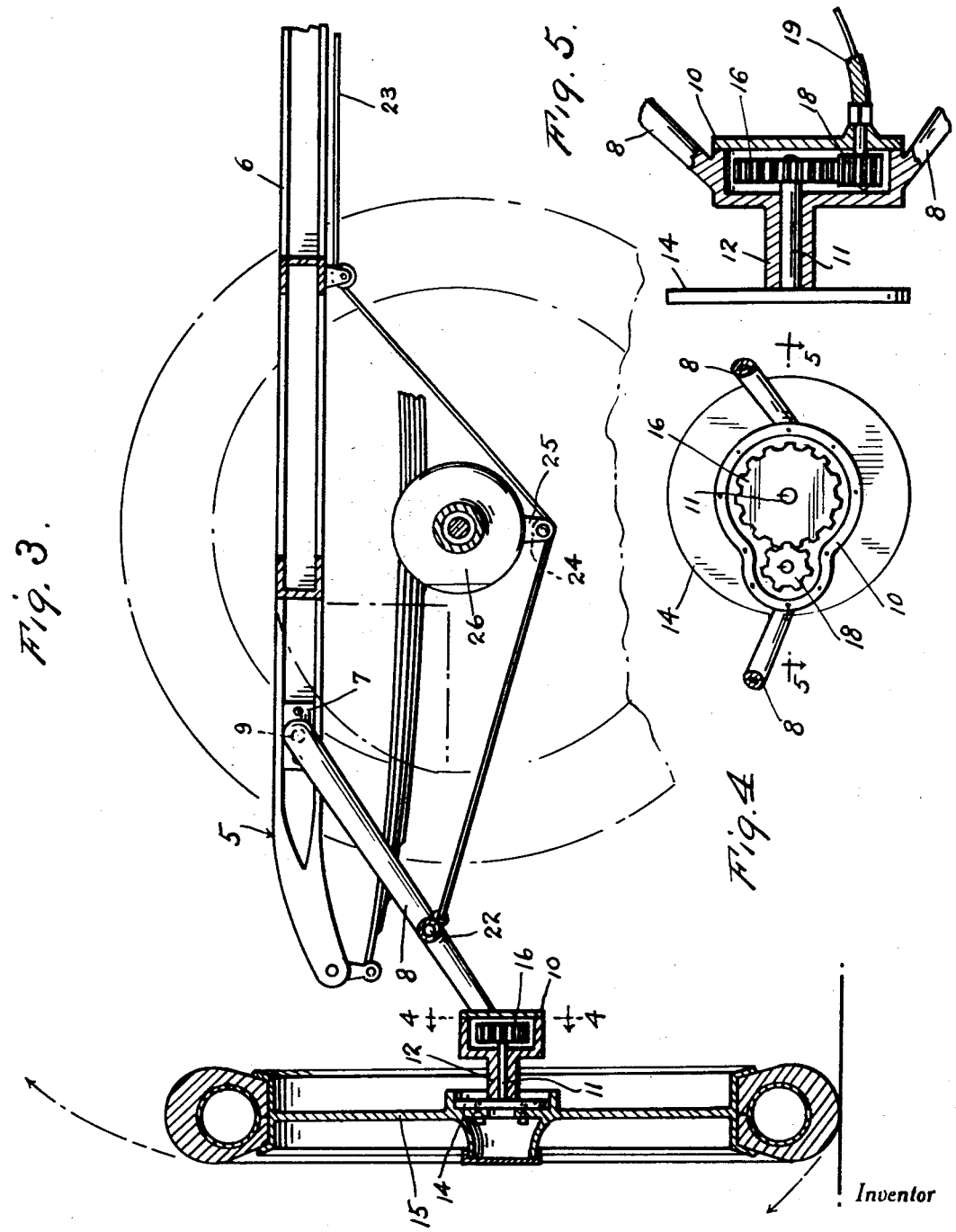

Feb. 20, 1934.  M. H. HOLLINGSWORTH  1,947,598
AUTOMOBILE PARKING DEVICE
Filed Feb. 7, 1933  5 Sheets-Sheet 4
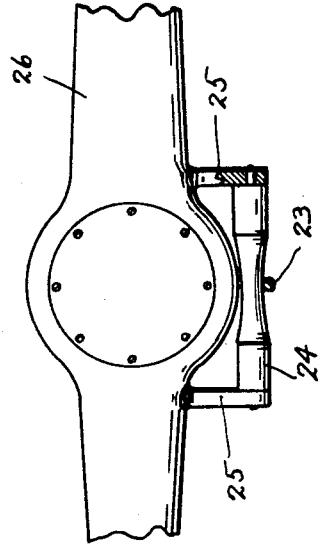
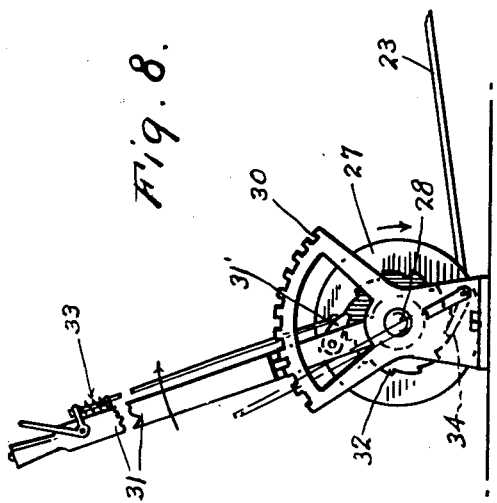
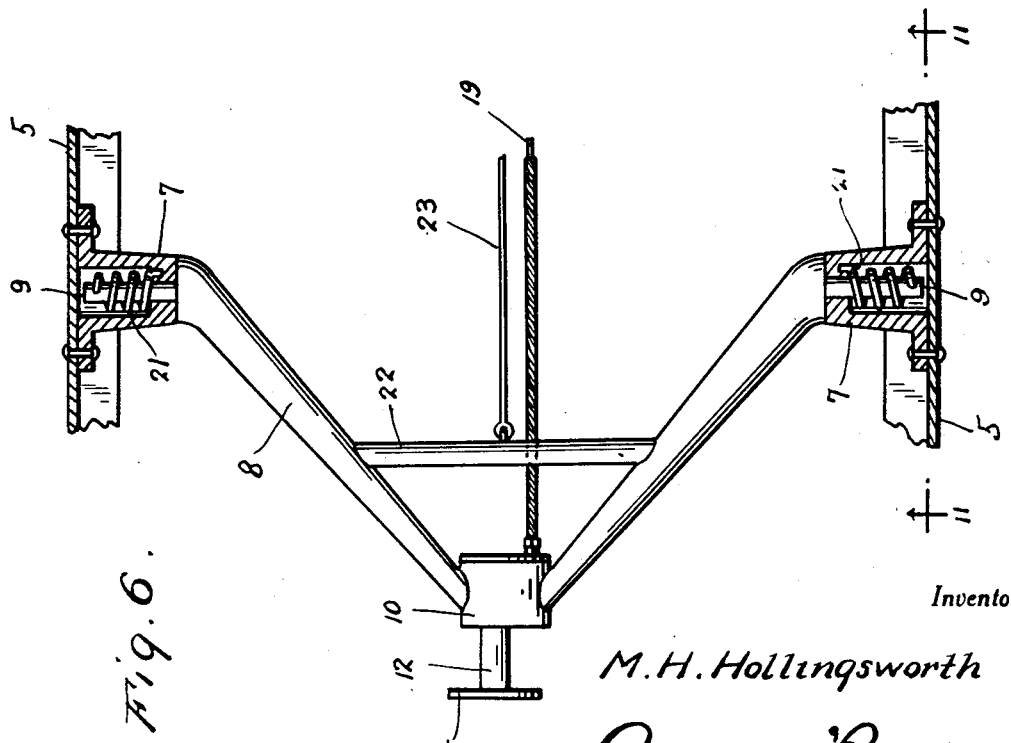
Inventor
M. H. Hollingsworth
By Clarence A. O'Brien
Attorney Feb. 20, 1934.                M. H. HOLLINGSWORTH                1,947,598
                              AUTOMOBILE PARKING DEVICE
                              Filed Feb. 7, 1933        5 Sheets-Sheet 5
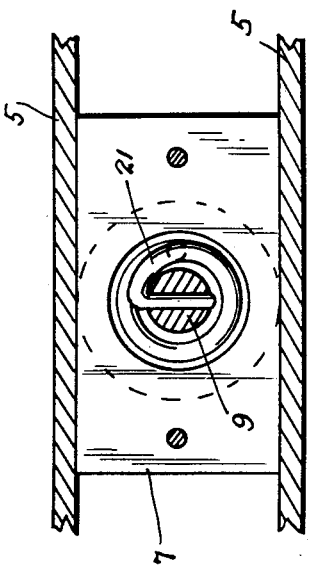
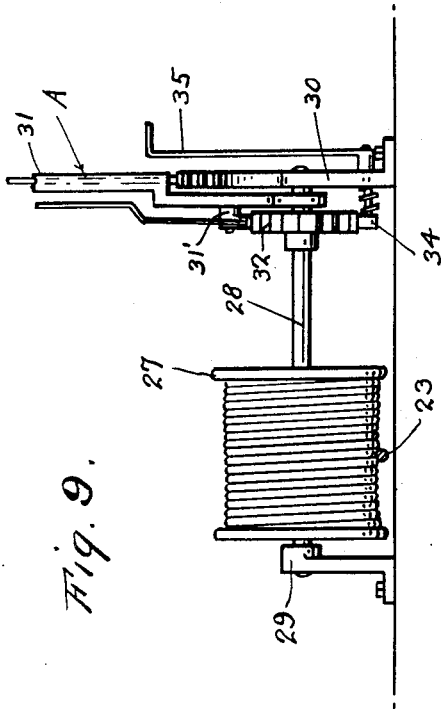
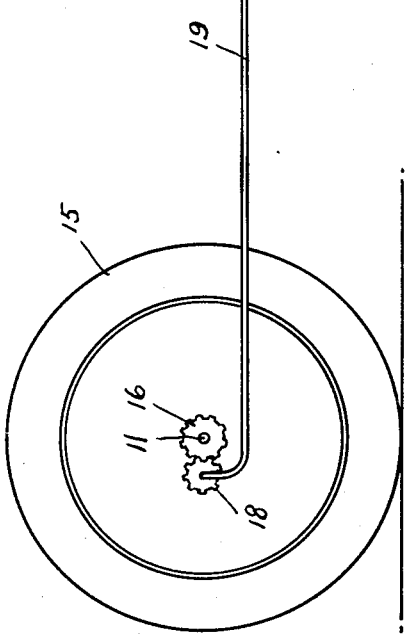
Inventor
M. H. Hollingsworth
By *Clarence A. O'Brien*
                        Attorney Patented Feb. 20, 1934

1,947,598

UNITED STATES PATENT OFFICE 1,947,598

AUTOMOBILE PARKING DEVICE

Maurice H. Hollingsworth, Miami Beach, Fla.

Application February 7, 1933. Serial No. 655,646

2 Claims. (Cl. 180—1)

The present invention relates to automobile parking devices and more particularly to a mechanism which utilizes a spare tire or spare wheel of an automobile for parking the same.

The prime object of the invention resides in the provision of means whereby the spare tire or spare wheel of an automobile is adapted for use in parking an automobile in very crowded spaces and the like.

Another object of the invention resides in the provision of a device of this nature which is simple in its construction, comparatively inexpensive to manufacture and install, convenient to operate, thoroughly efficient and reliable in use and otherwise well adapted to the purpose for which it is designed.

With the above the numerous other objects in view as will appear as the description proceeds, the invention consists in certain novel features of construction, and in the combination and arrangement of parts as will be hereinafter more fully described and claimed.

In the drawings:

Figure 3 is a detail longitudinal section taken substantially on the line 3—3 of Figure 2.

Figure 4 is a detail sectional view taken substantially on the line 4—4 of Figure 3.

Figure 5 is a detail sectional view taken substantially on the line 5—5 of Figure 4.

Figure 6 is a plan view of the frame of the device showing the bearings in section.

Figure 7 is a detail view of the central portion of the rear axle housing showing the pulley mounted thereunder.

Figure 8 is a side elevation of the pawl and ratchet mechanism.

Figure 9 is a detail view of the reel and the pawl and ratchet mechanism.

Figure 10 is a diagrammatic view of the mechanism, and

Figure 11 is an enlarged detail section taken substantially on the line 11—11 of Figure 6.

Figure 1:
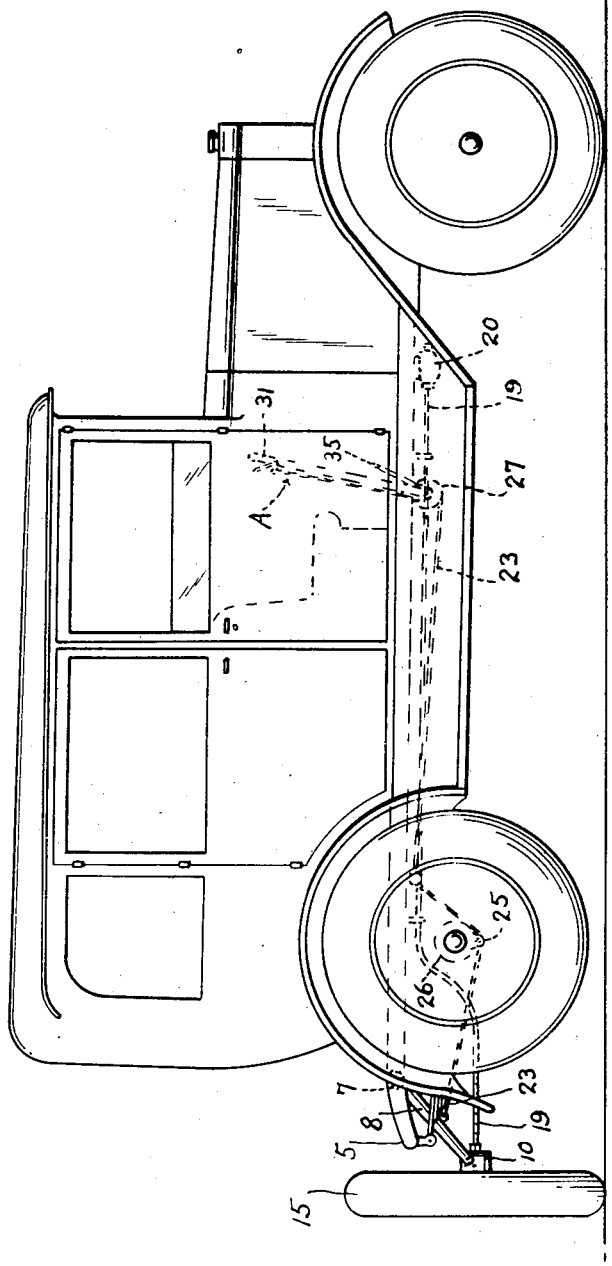
Figure 1 is a side elevation of an automobile showing an adaptation of my invention thereon.
Figure 2:
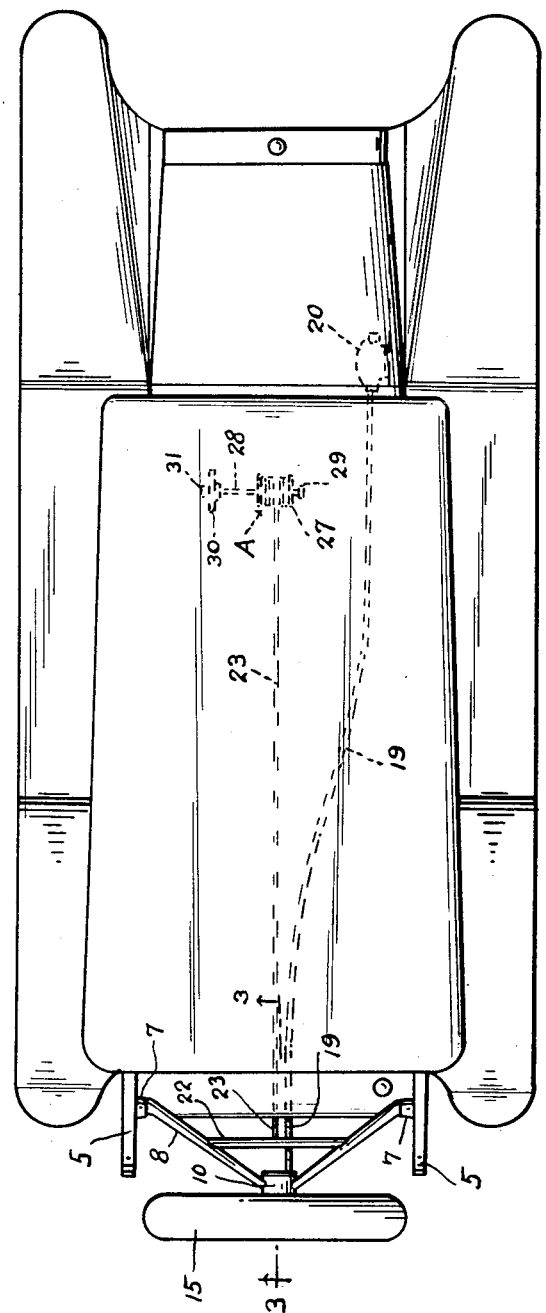
Figure 2 is a top plan view thereof.

Referring to the drawings in detail it will be seen that numeral 5 denotes the rear ends of the sides 6 of an automobile frame. In these end members 5 are mounted bearings 7 which project inwardly toward each other. Numeral 8 denotes a substantially V-shaped frame having at its ends outwardly directed reduced trunnions 9 journalled in the bearings 10. The apex of the frame 8 is in the form of a gear housing 10 in which is rotatable a shaft 11 extending through a rearwardly directed sleeve 12 formed on the housing. At the rear end of this shaft 11 there is mounted a disk 14 to which a spare wheel or the like 15 is attached. On the shaft 11 inside the housing 10 there is keyed a gear 16 meshing with a pinion 18 operable by a flexible shaft 19 from an electric motor 20 carried by the automobile at a convenient point, so that this electric motor may be energized in either direction from a battery or suitable source of electrical energy for the purpose of rotating the wheel 15 in either direction. The frame 8 is normally held in a raised position by springs 21. Each spring 21 has one end fixed to its trunnion 9 and its other end fixed in the bearing 7 as is illustrated clearly in Figures 6 and 11. A cross bar 22 is mounted between the arms of the frame 8 and a cable 23 is engaged therewith and trained under a pulley 24 mounted to rotate in hangers 25 depending from the rear axle housing 26. This cable is windable on a reel 27 fixed on a shaft 28. The shaft 28 is mounted in suitable brackets 29 and 30 carried by the automobile. Letter A denotes generally a suitable pawl and ratchet operating mechanism for the shaft 28 and of course other equivalent means may be substituted therefor. To describe this particular pawl and latch mechanism by way of example it will be noted that it comprises a lever 31 rockable on the shaft 28 and having a pawl 31 engageable with a ratchet wheel 32 fixed to the shaft 28 and controlled by a spring actuated link and lever structure 33 of conventional type. A pawl 34 is mounted on the bracket 30 for engagement with the ratchet wheel 32 and is controlled by a suitable lever 35.

Now when the motorist desires to park his car he drives the front of the car into the front of the parking space and then he manipulates pawl and ratchet mechanism A so as to jack the rear end of the car up as illustrated in Figures 1 and 3 and then by causing the energization of the motor in the proper direction the wheel 15 rotates to swing the rear end of the car into the parking place. Obviously to get out of the parking place the motorist reverses the operation just described.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, an automobile frame, a V-shaped frame having at its ends outwardly directed trunnions, bearings mounted on the automobile in which the trunnions are journalled, springs on the trunnions and engaged with the bearings to normally raise the apex portion of the frame upwardly, said apex portion of the frame being in the form of a gear casing, a shaft in the casing, gearing in the casing for operating the shaft, and means for detachably mounting a wheel on the shaft, a cross bar in the V-shaped frame, a cable attached to the cross bar, a reel on which the cable is windable, means for mounting the reel on the automobile frame, and means for rotating the reel.

2. The combination with an automobile, of wheel supporting means mounted on said automobile for vertical movement relative thereto, and having motion transmitting means for rotatably supporting a spare wheel on an axis extending lengthwise of said automobile, means for actuating said wheel supporting means to move said spare wheel into supporting contact with the ground, an electric motor mounted on the automobile, and flexible drive means operatively connecting said electric motor with said motion transmitting means for rotating said spare wheel.

MAURICE H. HOLLINGSWORTH.